(12) United States Patent
Satapathy et al.

(10) Patent No.: US 11,579,808 B2
(45) Date of Patent: Feb. 14, 2023

(54) FABRIC DRIVEN NON-VOLATILE MEMORY EXPRESS SUBSYSTEM ZONING

(71) Applicant: Hewlett Packard Enterprise Development LP, Houston, TX (US)

(72) Inventors: Asutosh Satapathy, Bangalore (IN); Komateswar Dhanadevan, Bangalore (IN); Krishna Babu Puttagunta, Rocklin, CA (US); Vivek Agarwal, Westborough, MA (US); Rupin T. Mohan, Northborough, MA (US); Govind Chandru Rathod, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/318,931

(22) Filed: May 12, 2021

(65) Prior Publication Data

US 2021/0263686 A1   Aug. 26, 2021

Related U.S. Application Data

(63) Continuation of application No. 16/557,562, filed on Aug. 30, 2019, now Pat. No. 11,113,001.

(51) Int. Cl.
*G06F 3/06* (2006.01)
(52) U.S. Cl.
CPC .......... *G06F 3/0659* (2013.01); *G06F 3/0607* (2013.01); *G06F 3/067* (2013.01); *G06F 3/0679* (2013.01)
(58) Field of Classification Search
CPC ...... G06F 3/0659; G06F 3/0607; G06F 3/067; G06F 3/0679

USPC ........................................................ 711/154
See application file for complete search history.

(56) References Cited

U.S. PATENT DOCUMENTS

| 10,348,830 B1 | 7/2019 | Malwankar et al. |
| 2016/0087841 A1 | 3/2016 | Bharadwaj et al. |
| 2018/0089101 A1 | 3/2018 | Sternberg et al. |
| 2018/0191721 A1 | 7/2018 | Freyensee et al. |

(Continued)

FOREIGN PATENT DOCUMENTS

WO   2016/195634 A1   12/2016

OTHER PUBLICATIONS

Ayandeh, "NVMe Over Fabric Architecture & Functional Model," Sep. 2015, 21 pages. <https://standards.incits.org/apps/group_pubiic/downioad.php/81208/T11-2015-327v1.pdf>.

(Continued)

*Primary Examiner* — Christopher B Shin
(74) *Attorney, Agent, or Firm* — Trop, Pruner & Hu, P.C.

(57) ABSTRACT

In some examples, fabric driven NVMe subsystem zoning may include receiving, from a non-volatile memory express (NVMe) Name Server (NNS), a zoning specification that includes an indication of a host that is to communicate with a given NVMe subsystem of an NVMe storage domain. Based on the zoning specification, the host may be designated as being permitted to connect to the given NVMe subsystem of the NVMe storage domain. An NVMe connect command may be received from the host. Based on the designation and an analysis of the NVMe connect command, a connection may be established between the given NVMe subsystem of the NVMe storage domain and the host.

19 Claims, 11 Drawing Sheets

(56) References Cited

U.S. PATENT DOCUMENTS

| | | | |
|---|---|---|---|
| 2018/0270119 A1 | 9/2018 | Ballapuram | |
| 2018/0284990 A1 | 10/2018 | Kachare et al. | |
| 2018/0285019 A1 | 10/2018 | Olarig et al. | |
| 2019/0065412 A1 | 2/2019 | Oiu et al. | |
| 2019/0146675 A1 | 5/2019 | Subramanian et al. | |
| 2019/0155517 A1 | 5/2019 | Chinnamaharajan et al. | |
| 2019/0391876 A1* | 12/2019 | Kundu | G06F 3/0688 |
| 2020/0073553 A1 | 3/2020 | Klein et al. | |
| 2020/0081640 A1* | 3/2020 | Enz | G06F 13/4027 |
| 2020/0293465 A1 | 9/2020 | Yang et al. | |
| 2020/0293483 A1 | 9/2020 | Haimzon et al. | |
| 2020/0356498 A1 | 11/2020 | Shtivelman et al. | |

OTHER PUBLICATIONS

Azhagarasu A, "Zoning in Brocade FC SAN switch for beginners", available online at <https://sanenthusiast.com/zoning-in-brocade-fc-san-switch-for-beginners/>, Aug. 11, 2013, 15 pages.

Brocade Communications Systems, Inc., "Brocade Fibre Channel Security Best Practices", Oct. 10, 2016, 23 pages.

Carison, et al., "Introducing FC-NVMe," Feb. 17, 2017, Fibre Channel industry Association, 59 pages. <https://fibrechannel.org/wp-content/u ploads/2017/02/FC-NVMe-Webinar-Final.pdf>.

Cisco UCS Manager Storage Management Guide, "Fibre Channel Zoning", Release 3.1, Jan. 1, 2018, pp. 1-12.

Cisco, "Cisco Fabric Manager IP Services Configuration Guide," copyright 2018, 78 pages. <https://www.cisco.com/c/en/us/td/docs/switches/datacenter/mds9000/sw/5_0/configuration/guides/ipsvc/fm/ipsvc/ciscsi.html>.

Unknown, "NVM Express (Trademarks) over Fabrics", NVM Express (Registered), Revision 1.0a, Ratified Jul. 23, 2018, 51 pages.

Unknown, "NVM Express", NVM Express (Registered), Revision 1.3, May 1, 2017, 282 pages.

Wikipedia, "Fibre Channel Zoning", available online at <https://en.wikipedia.org/w/index.phptitle=Fibre_Channel_zoning&oldid=627019285>, Sep. 25, 2014, 2 pages.

* cited by examiner

400

RECEIVE, FROM A NON-VOLATILE MEMORY EXPRESS (NVME) NAME SERVER (NNS), A ZONING SPECIFICATION THAT INCLUDES AN INDICATION OF A HOST THAT IS TO COMMUNICATE WITH A GIVEN NVME SUBSYSTEM OF AN NVME STORAGE DOMAIN THAT INCLUDES A PLURALITY OF NVME SUBSYSTEMS
402

DESIGNATE, BASED ON THE ZONING SPECIFICATION, THE HOST AS BEING PERMITTED TO CONNECT TO THE GIVEN NVME SUBSYSTEM OF THE NVME STORAGE DOMAIN
404

RECEIVE, FROM THE HOST, AN NVME CONNECT COMMAND
406

ESTABLISH, BASED ON THE DESIGNATION AND AN ANALYSIS OF THE NVME CONNECT COMMAND, A CONNECTION BETWEEN THE GIVEN NVME SUBSYSTEM AND THE NVME STORAGE DOMAIN TO THE HOST
408

FIG. 4

FABRIC DRIVEN NON-VOLATILE MEMORY EXPRESS SUBSYSTEM ZONING

BACKGROUND

Non-volatile memory (NVM) is a type of computer memory that retains its contents across power cycles and is therefore capable of being used as storage. Compared to volatile memory that needs power to retain data, NVM may continue to store data even after computer power is turned off. With respect to NVM, NVM Express (NVMe) is a logical device interface specification for accessing NVM.

BRIEF DESCRIPTION OF DRAWINGS

Features of the present disclosure are illustrated by way of example and not limited in the following figure(s), in which like numerals indicate like elements, in which:

FIG. 4 illustrates a flowchart of an example method for fabric driven NVMe subsystem zoning in accordance with an example of the present disclosure.

DETAILED DESCRIPTION

Figure 1:
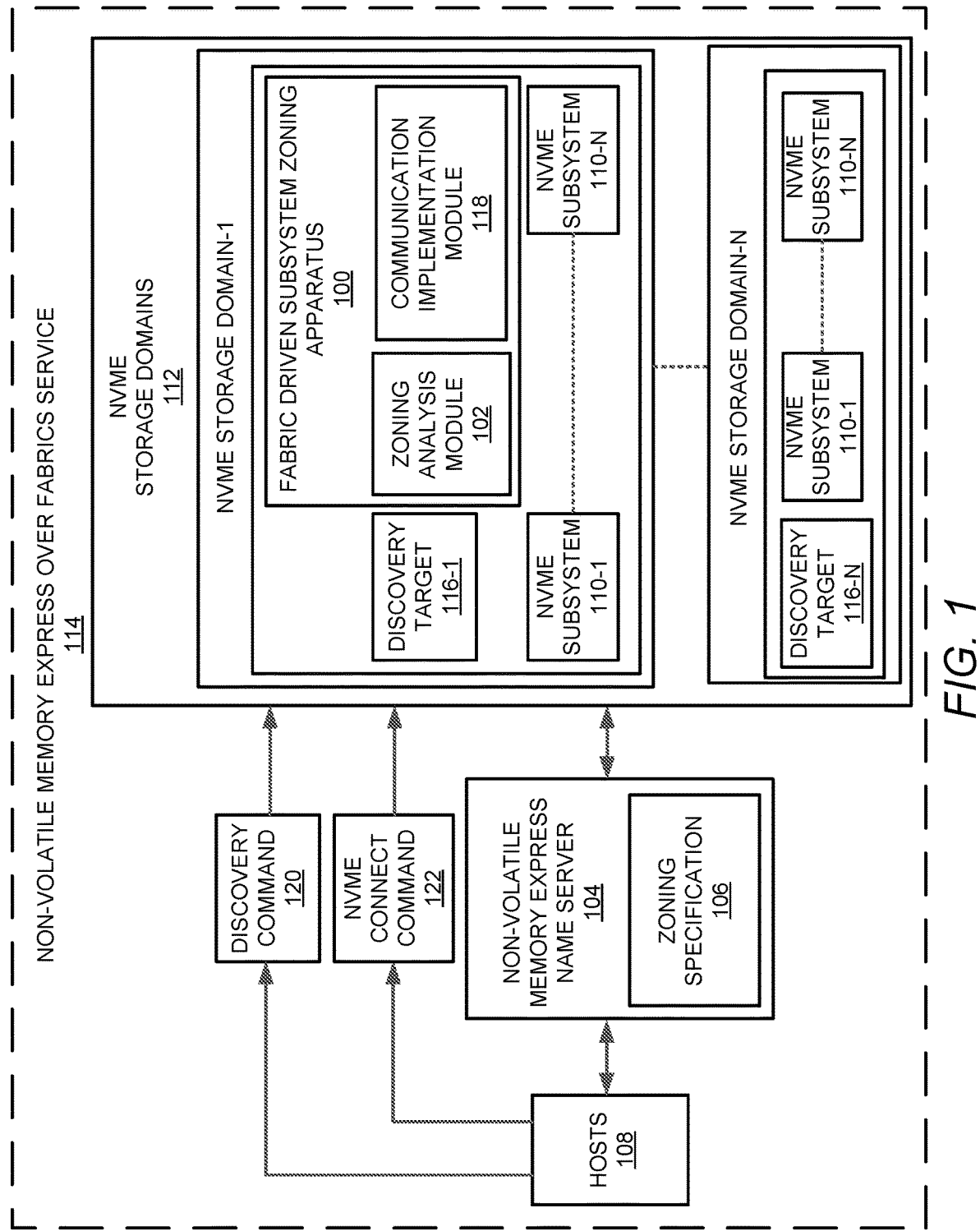
FIG. 1 illustrates a layout of a fabric driven NVMe subsystem zoning apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Fabric driven non-volatile memory express (NVMe) subsystem zoning apparatuses, methods for fabric driven NVMe subsystem zoning, and non-transitory computer readable media having stored thereon machine readable instructions to provide fabric driven NVMe subsystem zoning are disclosed herein. The apparatuses, methods, and non-transitory computer readable media disclosed herein provide for NVMe subsystem NVMe qualified name (NQN) based zoning, for example, by masking out irrelevant NQNs in information that is provided to a host, after receiving zoning information from an NVMe Name Server (NNS) deployed in a fabric through which zoning is enforced. In examples described herein, "masking" means a selection or authorization process where access (of a storage device) is permitted to selected hosts and denied to all other hosts. For example, masking may refer to a mapping process between host NQN and storage subsystem NQN, which means that selected hosts can access a given subsystem and all others are denied access.

With respect to NVMe protocols, a storage system may handle and service thousands of persistent storage read or write commands in parallel. In order to implement these benefits to enterprise class data centers, NVMe may be extended over fabrics for increased scalability and shareability. In this regard, NVMe over Fabrics (NVMe-oFM) is a flexible transport abstraction layer that provides for a consistent definition of NVMe over different fabric types, including Ethernet and Fibre Channel. NVMe over Ethernet may be dependent on multiple transport layers based, for example, on remote direct memory access (RDMA), RDMA over Converged Ethernet (RoCE) v1/v2, Internet Wide-area RDMA Protocol (iWARPM)), or transmission control protocol/Internet Protocol (TCP/IP).

In a relatively large enterprise class fabric (irrespective of protocol), end nodes, such as hosts, may need to securely communicate with other devices (generally referred to as NVMe storage domains or targets) on the fabric. In this regard, when NVMe-oF is used over RoCE, a host may use a discover command to obtain a log page by communicating with a discovery target (also referred to as a discovery controller) that includes NVMe subsystem NQNs of all available NVMe subsystems of an NVMe storage domain that are managed by the discovery target. The host may receive, in the log page, irrelevant target NVMe subsystem NQNs that are not needed to establish the connection with a particular NVMe subsystem. The receipt of irrelevant NVMe subsystem NQNs may create security challenges in that communication parameters for NVMe subsystem NQNs that are not designated to communicate with a host may nevertheless be sent to the host. Further, the transmission and analysis of irrelevant NVMe subsystem NQNs may delay establishment of a connection between a zoned host and NVMe subsystem pair.

Examples described herein may address these issues by implementing NQN based zoning. In this regard, after a zoning notification is received from an NNS, an NVMe storage domain that includes the fabric driven NVMe subsystem zoning apparatus may mask all irrelevant NVMe subsystem NQNs, that are different from the NVMe subsystem NQN(s) sent by the zoning notification. Further, a host may utilize the NVMe subsystem NQN sent by the NNS to establish a connection with the NVMe subsystem. The host may also bypass a discovery phase with respect to an NVMe subsystem, since the NVMe storage domain already has a zoning notification from the NNS that specifies a host that is to communicate with an NVMe subsystem of the NVMe storage domain.

According to examples disclosed herein, the apparatuses, methods, and non-transitory computer readable media disclosed herein provide for NVMe subsystem NQN based zoning to limit exposure of a zoned subsystem NQN to a zoned pair including a host and an NVMe subsystem.

According to examples disclosed herein, the NNS as disclosed herein may forward data to an NVMe storage domain by using an async notification to facilitate the NVMe storage domain to mask out all irrelevant NVMe subsystem NQNs at an NVMe storage domain from being discovered by a particular zoned host.

In examples described herein, module(s), as described herein, may be any combination of hardware and programming to implement the functionalities of the respective module(s). In some examples described herein, the combinations of hardware and programming may be implemented in a number of different ways. For example, the programming for the modules may be processor executable instructions stored on a non-transitory machine-readable storage medium and the hardware for the modules may include at least one processing resource (e.g., at least one processor, CPU, circuitry, etc.) to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

FIG. 1 illustrates a layout of an example fabric driven NVMe subsystem zoning apparatus (hereinafter also referred to as "apparatus 100").

Referring to FIG. 1, the apparatus 100 may include a zoning analysis module 102 to receive, from a non-volatile memory express (NVMe) Name Server (NNS) 104, a zoning specification 106 that includes an indication of a host (of a plurality of hosts 108) that is to communicate with a given NVMe subsystem (of a plurality of NVMe subsystems 110) of an NVMe storage domain (of a plurality of NVMe storage domains 112). The hosts 108 and the NVMe storage domains 112 may be part of a storage access protocol fabric service, an example being an NVM Express™ over Fabrics (NVMe-oF™) service 114. Each NVMe storage domain may include a discovery target (also referred to as a discovery controller). For the example of FIG. 1, the discovery targets are designated 116-1, . . . 116-N, corresponding to NVMe storage domain-1, . . . NVMe storage domain-N. Similarly, each NVMe storage domain may include a plurality of NVMe subsystems 110, designated 110-1, . . . 110-N. The NVMe-oF service 114 may be attached to, be aware of, be part of, be associated with, and/or be otherwise related to a fabric to which the hosts 108 and NVMe storage domains 112 are communicatively connected.

According to examples disclosed herein, the zoning specification 106 may include an indication of an NVMe qualified name (NQN) for the host and an Internet Protocol (IP) address associated with the NQN for the host. Further, the zoning specification 106 may include an NQN for the given NVMe subsystem of the NVMe storage domain and an IP address associated with the NQN for the given NVMe subsystem of the NVMe storage domain.

A communication implementation module 118 may designate, based on the zoning specification 106, the host as being permitted to connect to the given NVMe subsystem of the NVMe storage domain.

The communication implementation module 118 may receive a discovery command 120 from the host. The communication implementation module 118 may forward, in response to the discovery command 120, a payload to the host. The payload may mask NVMe subsystems of the NVMe storage domain that are different from the given NVMe subsystem of the NVMe storage domain. Further, the payload may include an IP address associated with an NQN for the given NVMe subsystem of the NVMe storage domain.

The communication implementation module 118 may receive, from the host, an NVMe connect command 122. The NVMe connect command may include an indication of an IP address associated with an NQN for the host. Further, the NVMe connect command may include an NQN for the given NVMe subsystem of the NVMe storage domain and an IP address associated with the NQN for the given NVMe subsystem of the NVMe storage domain.

The communication implementation module 118 may establish, based on the designation and an analysis of the NVMe connect command 122, a connection between the given NVMe subsystem of the NVMe storage domain and the host.

According to examples disclosed herein, the communication implementation module 118 may determine whether the NVMe connect command is from the designated host. Based on a determination that the NVMe connect command is from the designated host, the communication implementation module 118 may determine whether an IP address of the given NVMe subsystem of the NVMe storage domain is associated with the designated host. Based on a determination that the IP address of the given NVMe subsystem of the NVMe storage domain is associated with the designated host, the communication implementation module 118 may establish the connection between the given NVMe subsystem of the NVMe storage domain and the designated host.

According to examples disclosed herein, the zoning analysis module 102 may receive, from the NNS 104, the zoning specification 106 that includes the indication of the host that is to communicate with the given NVMe subsystem of the NVMe storage domain by receiving, from the NNS 104, the zoning specification 106 that includes the indication of a port of the host that is to communicate with the given NVMe subsystem of the NVMe storage domain. In this regard, the zoning analysis module 102 may receive, from the NNS 104, another zoning specification that includes an indication of another port of the host that is to communicate with another given NVMe subsystem of the NVMe storage domain. The zoning analysis module 102 may further designate, based on the another zoning specification, the another port of the host as being permitted to connect to the another given NVMe subsystem of the NVMe storage domain. The communication implementation module 118 may receive, from the host, another NVMe connect command. In this regard, the communication implementation module 118 may establish, based on the further designation and an analysis of the another NVMe connect command, a connection between the another given NVMe subsystem of the NVMe storage domain and the another port of the host.

Operation of the apparatus 100 is described in further detail with reference to FIGS. 1-2G.

FIGS. 2A-2G illustrate performance of host and NVMe storage domain registrations, and NVMe switch zone driven NVMe storage domain masking to illustrate operation of the fabric driven NVMe subsystem zoning apparatus of FIG. 1 in accordance with an example of the present disclosure.

Figure 2A:
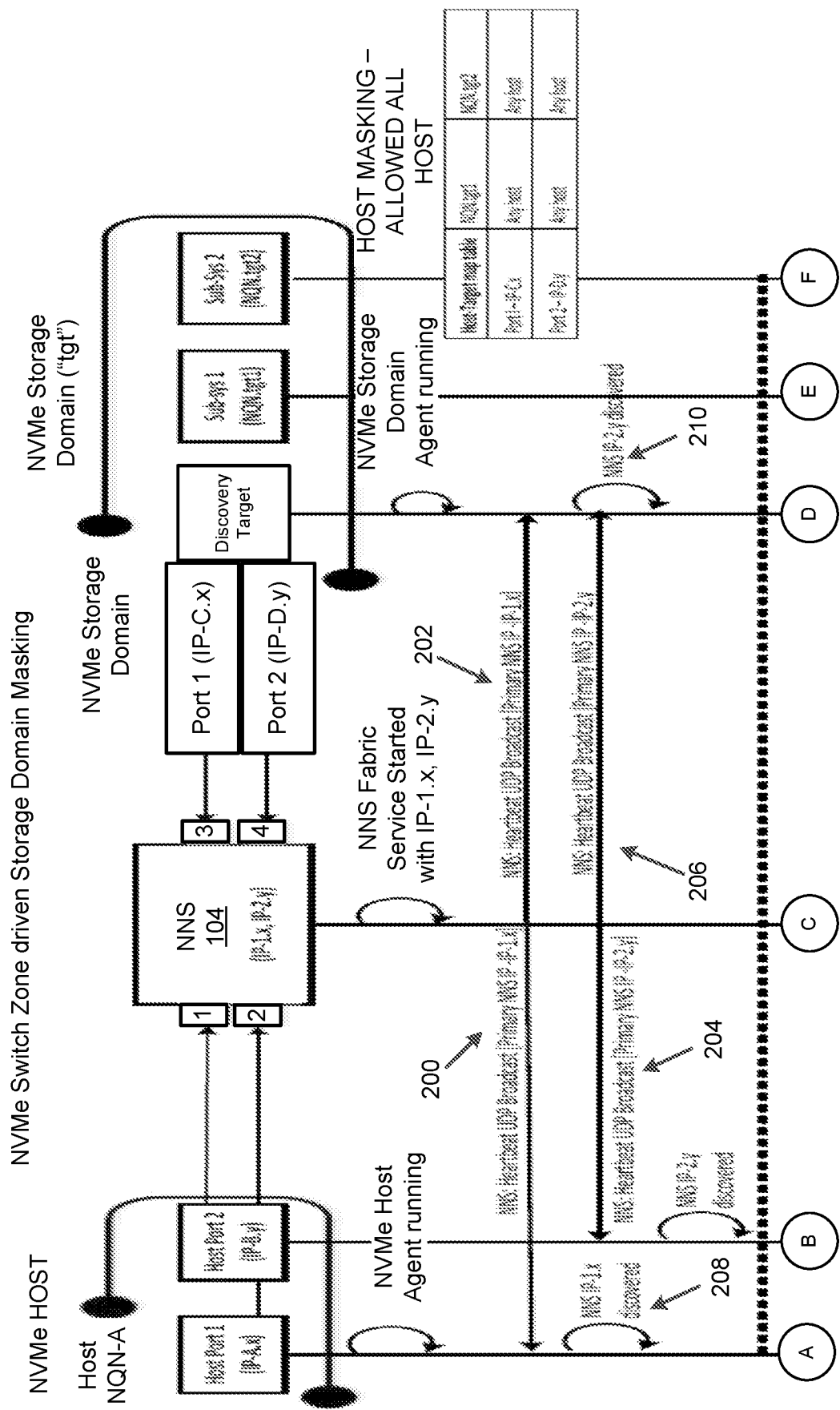
FIGS. 2A-2G illustrate performance of host and NVMe storage domain registrations, and NVMe switch zone driven NVMe storage domain masking to illustrate operation of the fabric driven NVMe subsystem zoning apparatus of FIG. 1 in accordance with an example of the present disclosure.
Figure 2B:
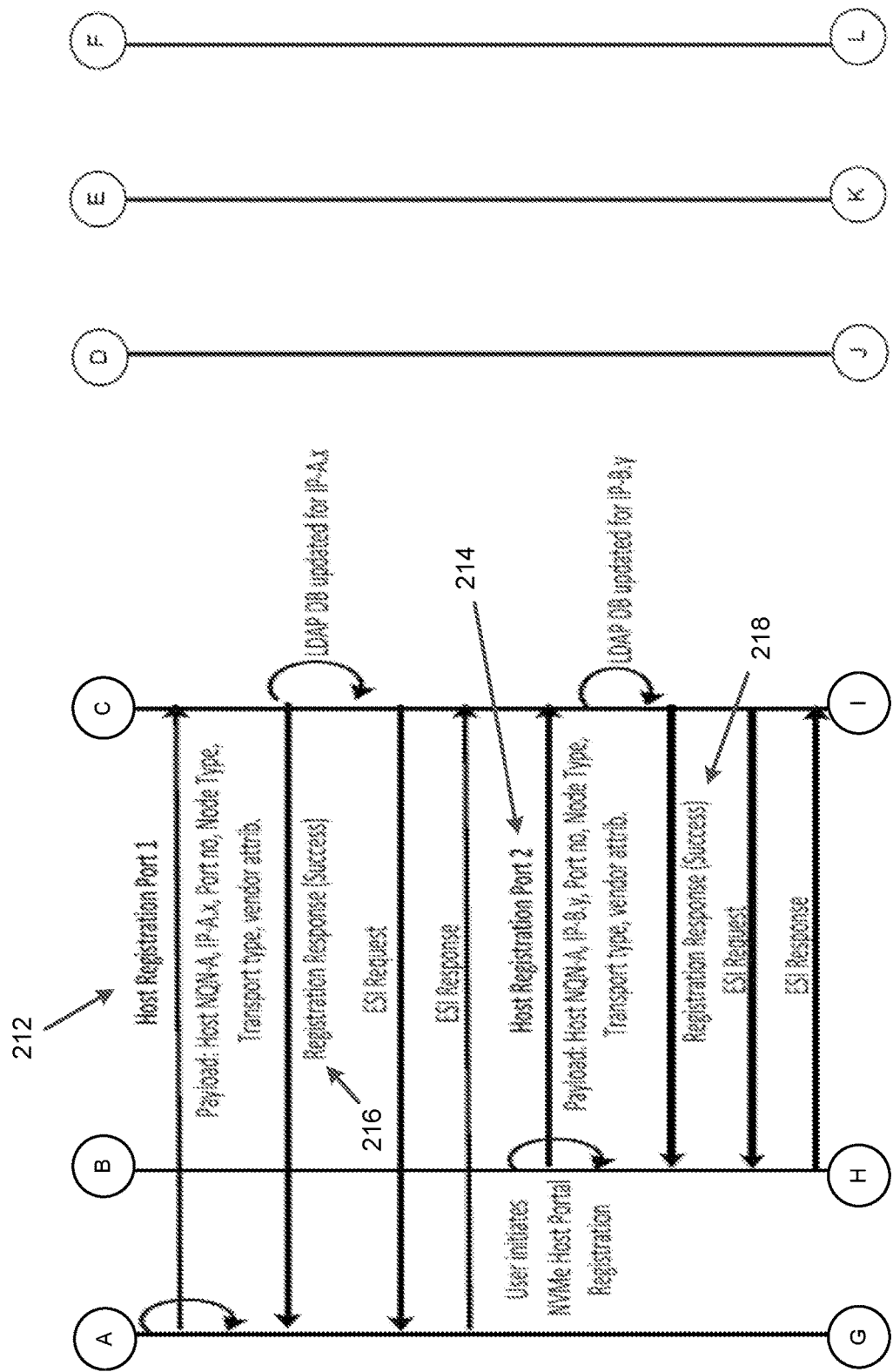
Figure 2C:
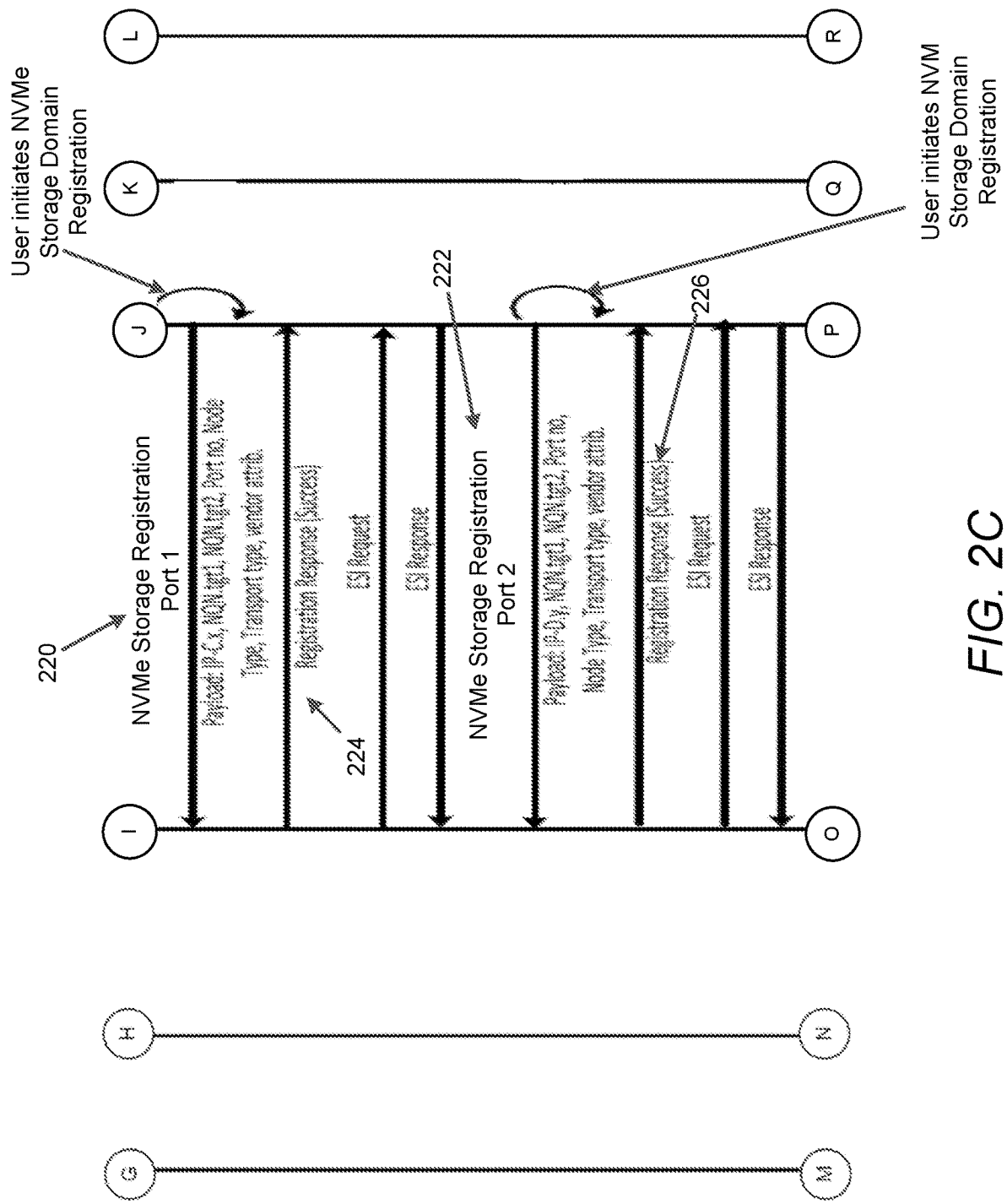
Figure 2D:
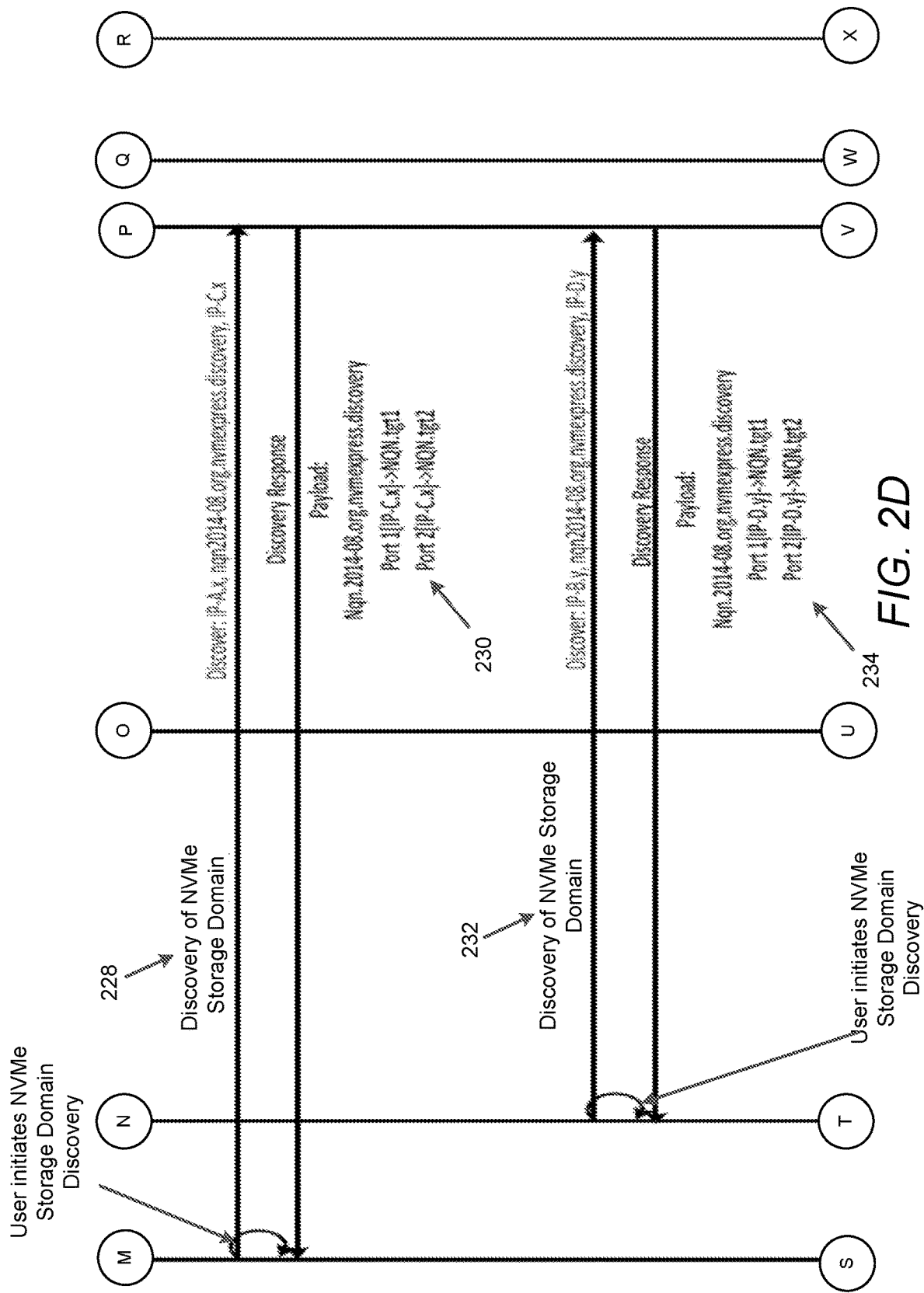
Figure 2E:
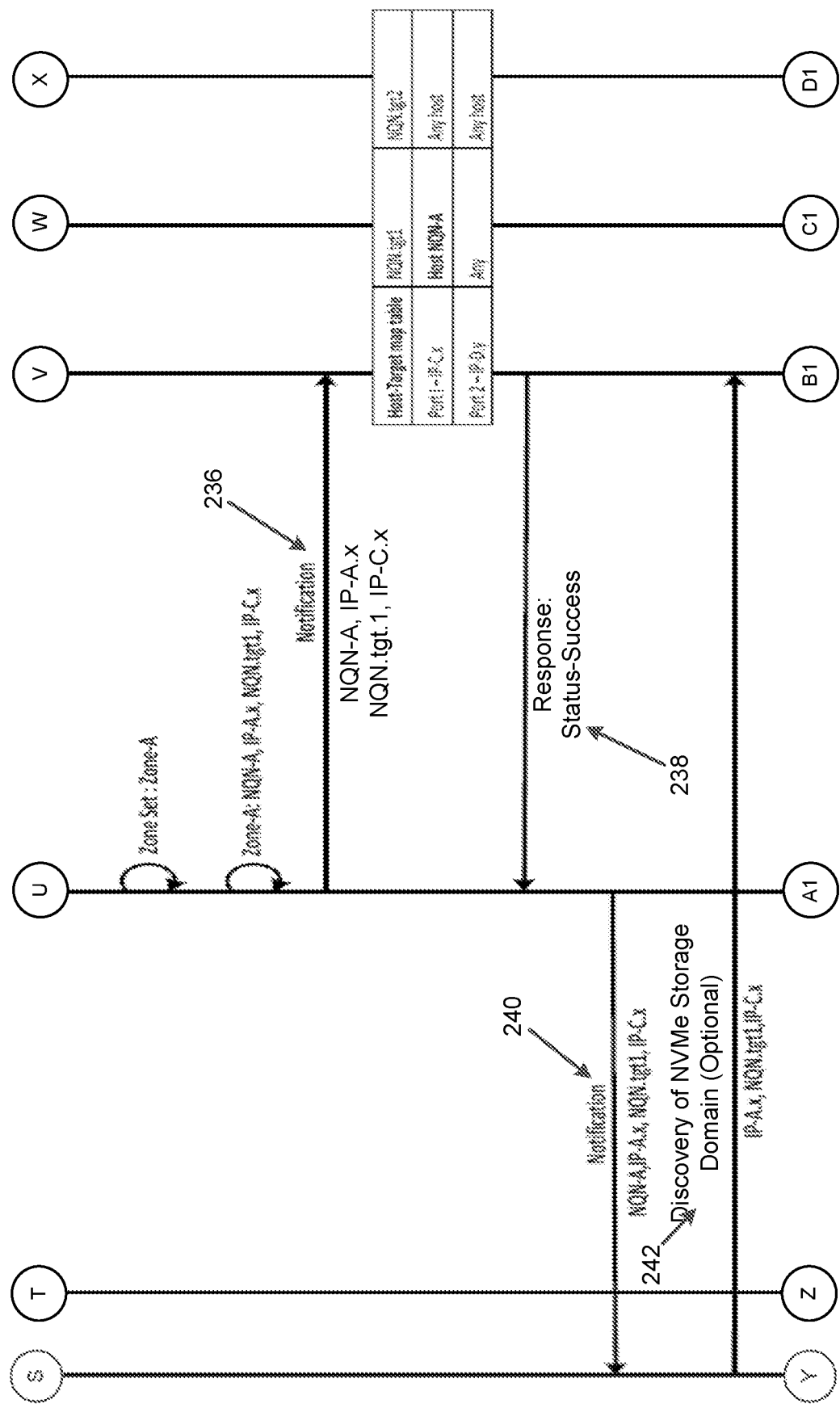
Figure 2F:
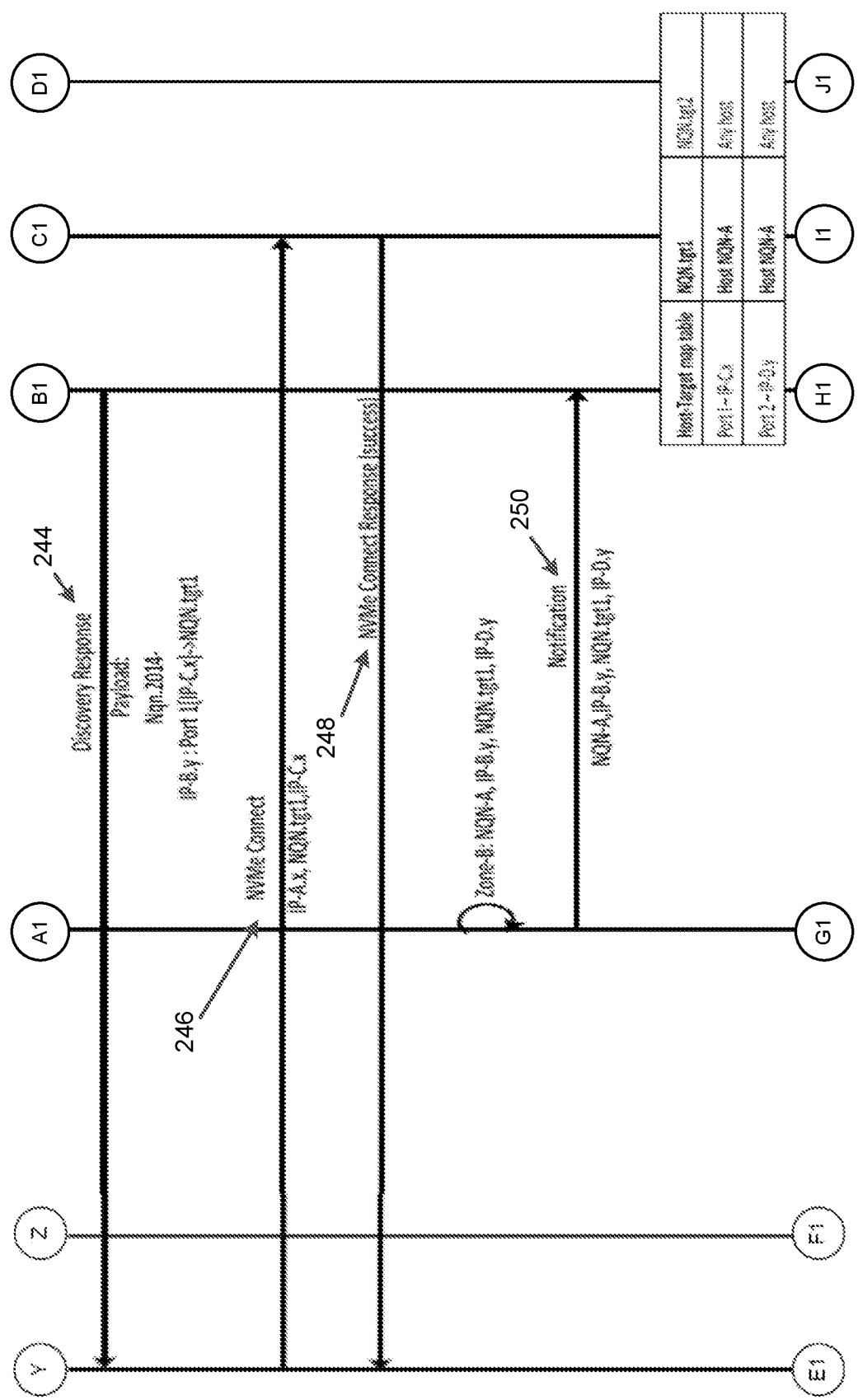
Figure 2G:
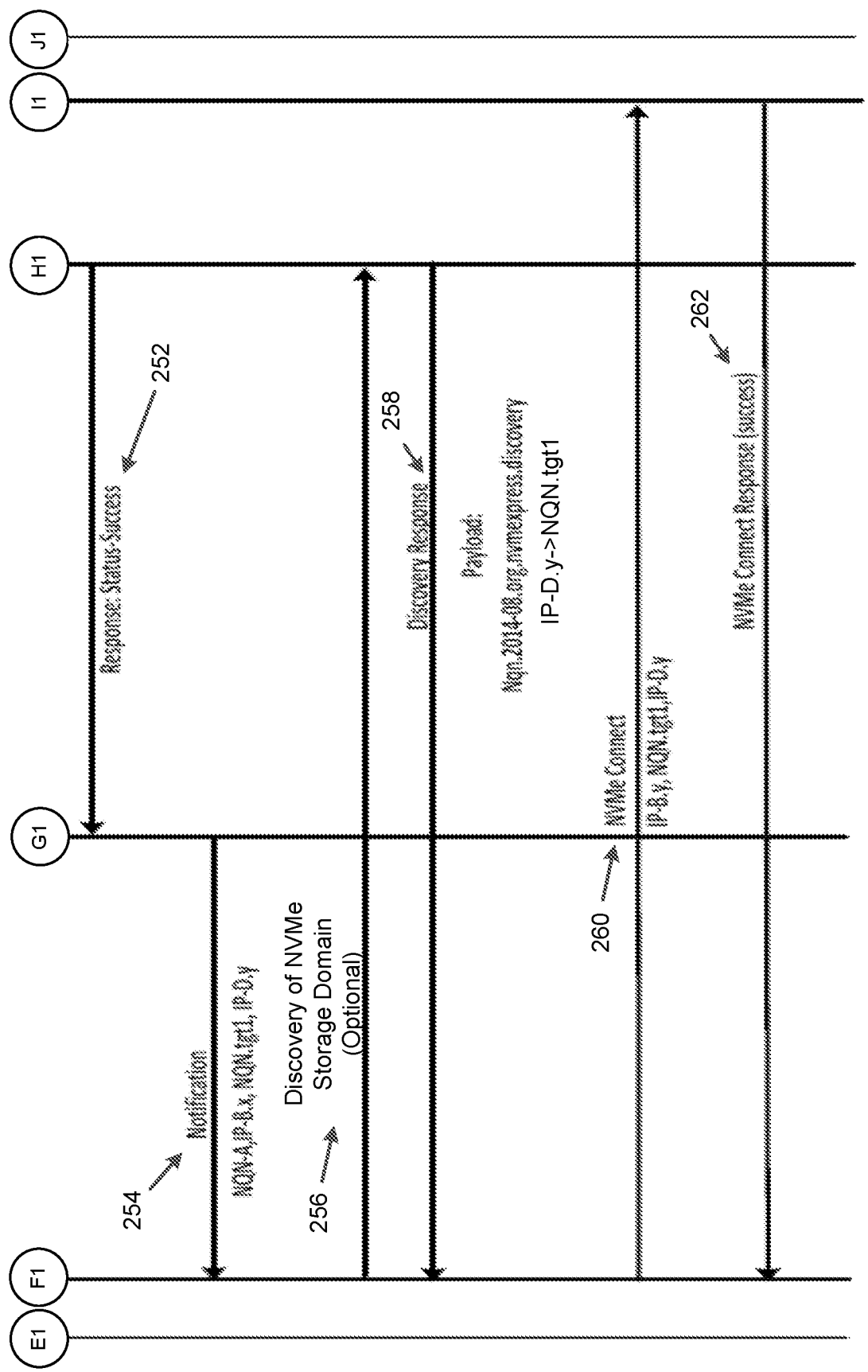

Referring to FIGS. 1, 2A-2G, and particularly FIG. 2A, at 200, 202, 204, and 206, the NNS 104 may broadcast presence of the NNS to all host and NVMe storage domain devices. For example, the NNS 104 may broadcast location parameters to a plurality of hosts 108 (or a single host) and a plurality of NVMe storage domains 112 (or a single NVMe storage domain) for discovery of the NVMe-oF service 114. Examples of location parameters may include IP address and port number for the NNS 104. The NNS 104 may be executed on switches or an external VM, and broadcast its presence to all host and NVMe storage domain devices as a pre-configured IP address (e.g., an IPv4/IPv6 address such as 10.10.10.2), and TCP port number (e.g., a port number such as 4420). The host and NVMe storage domain devices within the broadcast range may recognize the IP address of the NNS 104.

At 208, a host (e.g., each host) may discover the NVMe-oF service 114.

At 210, an NVMe storage domain may discover the NVMe-oF service 114.

Referring to FIG. 2B, at 212 and 214, host registration information (e.g., IP address, transport type, node type, MAC address, NON) may be sent to the NNS 104 at Port 1 and Port 2, respectively.

At 216 and 218, the host may be successfully registered to the NNS 104 at Port 1 and Port 2, respectively.

Referring to FIG. 2C, at 220 and 222, the NVMe storage domain-specific information (e.g., IP address, transport type, node type, MAC address, NQN) may be sent to the NNS 104 at Port 1 and Port 2, respectively.

At 224 and 226, the NVMe storage domain may be successfully registered to the NNS 104 at Port 1 and Port 2, respectively.

Referring to FIG. 2D, after each zoning, the NNS 104 may send a notification with respect to a zoned pair of host NON and NVMe subsystem NON along with respective IP addresses. For FIG. 2E, a zoned pair of host NON and NVMe subsystem NON may include Zone-A: NQN-A, IP-A.x, NQN.tgt1, IP-C.x. For FIG. 2F, a zoned pair of host NON and NVMe subsystem NON may include Zone-B: NQN-B, IP-B.y, NQN.tgt1, IP-D.y.

The NVMe subsystem may apply masking, and send a response for an NNS notification. With respect to masking, after zoning is performed at the NNS 104, an async notification may be sent to an NVMe storage domain. The NVMe storage domain may update a map table (e.g., masking) by extracting the host NON and NVMe subsystem NON from the NNS notification. Thereafter, the NVMe storage domain may send an acknowledgement for a received notification to the NNS 104. The NNS 104 may send another async notification to the NVMe host after receiving an acknowledgement for the masking from the NVMe storage domain. The NVMe host, after receiving the async notification from the NNS 104, may extract the NVMe subsystem NON and associated IP address, and send an NVMe connect command to the intended NVMe subsystem.

The NNS 104, upon receiving a successful notification response, may send a notification to the host with the same information (e.g., host NON, and NVMe subsystem NQN). The host may perform a discovery sequence to check the host masking of NVMe subsystem. This discovery sequence may or may not be performed. Thereafter, the host may initiate a connect request sequence as per the NVMe-oF specification by directly using the NVMe subsystem NQN obtained from the NNS zone change notification. This process may be repeated for all other zoned pair of host and NVMe subsystems. For example, the sequence described above with respect to masking may repeat for each zone created. Discovery may also be avoided to allow a host to directly connect to a particular subsystem using subsystem NQNs and an NVMe storage domain IP address obtained from an NNS notification after performance of zoning. As a result, a discovery sequence may be bypassed to thus reduce the time needed by a host to establish a connection with an NVMe storage domain. Thus, once a zone is created, a notification may be sent to the NVMe storage domain and the NVMe storage domain may create the needed masking based on the zone contents.

For example, at 228, an NVMe agent running on the host (e.g., NQN-A; Host Port 1 (IP-A.x)) may initiate discovery of the NVMe storage domain.

At 230, in response to the discovery request, a discovery response may include a payload as shown. For example, the payload may include the NVMe storage domain IP address and its associated subsystem NQN as follows: "IP-C.x→NQN.tgt1 IP-C.x→NQN.tgt2".

At 232, the NVMe agent running on the host (e.g., NQN-A; Host Port 2 (IP-B.y)) may initiate discovery of the NVMe storage domain.

At 234, in response to the discovery request, a discovery response may include a payload as shown. For example, the payload may indicate "IP-D.y→NQN.tgt1 IP-D.y→NQN.tgt2".

At 236, the zoning analysis module 102 may receive, from the NNS 104, a zoning specification 106 that includes an indication of a host that is to communicate with a given NVMe subsystem of an NVMe storage domain. The zoning specification 106 may include an indication of an NQN for the host (e.g., NQN-A) and an IP address (e.g., IP-A.x) associated with the NQN for the host. Further, the zoning specification 106 may include an NQN (e.g., NQN.tgt1) for the given NVMe subsystem (e.g., Sub.sys-1) of the NVMe storage domain and an IP address (e.g., IP-C.x) associated with the NQN for the given NVMe subsystem of the NVMe storage domain. For example, the zoning specification 106 may include a Zone-A specification that indicates "NQN-A, IP-A.x, NQN.tgt1, IP-C.x".

At 238, the communication implementation module 118 may generate a success response to the zoning specification 106. The success response may be sent to the NNS 104.

At 240, the NNS 104 may forward a notification with respect to the zoning specification 106 to the host.

At 242, the communication implementation module 118 may receive a discovery command 120 from the host. The discovery at 242 may or may not be performed (e.g., because of the discovery previously performed at 228, 230, 232, and 234). For example, the discovery command 120 may indicate "IP-A.x, NQN.tgt1, IP-C.x".

At 244, the communication implementation module 118 may forward, in response to the discovery command 120, a payload to the host. The payload may mask NVMe subsystems of the NVMe storage domain that are different from the given NVMe subsystem of the NVMe storage domain. Further, the payload may include an IP address associated with an NQN for the given NVMe subsystem of the NVMe storage domain. For example, the payload may indicate "IP-C.x→NQN.tgt1".

At 246, the communication implementation module 118 may receive, from the host, an NVMe connect command 122. The NVMe connect command may include an indication of an IP address (e.g., IP-A.x) associated with an NQN for the host. Further, the NVMe connect command may include an NQN (e.g., NQN.tgt1) for the given NVMe subsystem of the NVMe storage domain and an IP address (e.g., IP-C.x) associated with the NQN for the given NVMe subsystem of the NVMe storage domain. For example, the NVMe connect command 122 may indicate "IP-A.x, NQN.tgt1, IP-C.x".

At 248, the communication implementation module 118 may establish, based on the designation and an analysis of the NVMe connect command 122, a connection between the given NVMe subsystem of the NVMe storage domain and the host. In this regard, the communication implementation module 118 may determine whether the NVMe connect command is from the designated host. Based on a determination that the NVMe connect command is from the designated host, the communication implementation module 118 may determine whether an IP address of the given NVMe subsystem of the NVMe storage domain is associated with the designated host. Based on a determination that the IP address of the given NVMe subsystem of the NVMe storage domain is associated with the designated host, the communication implementation module 118 may establish the connection between the given NVMe subsystem of the NVMe storage domain and the designated host.

As disclosed herein, the zoning analysis module 102 may receive, from the NNS 104, the zoning specification 106 that includes the indication of the host that is to communicate with the given NVMe subsystem of the NVMe storage domain by receiving, from the NNS 104, the zoning specification 106 that includes the indication of a port (e.g., Port 1) of the host that is to communicate with the given NVMe subsystem (e.g., Sub-sys 1) of the NVMe storage domain. In this regard, at 250, the zoning analysis module 102 may receive, from the NNS 104, another zoning specification that includes an indication of another port (e.g., Port 2) of the host that is to communicate with another given NVMe subsystem (e.g., Sub-sys 2) of the NVMe storage domain. For example, the another zoning specification may include a Zone-B specification that indicates "NQN-A, IP-B.y, NQN.tgt1, IP-D.y".

The zoning analysis module 102 may further designate, based on the another zoning specification, the another port (e.g., Port 2) of the host as being permitted to connect to the another given NVMe subsystem (e.g., Sub-sys 2) of the NVMe storage domain.

At 252, the communication implementation module 118 may generate a success response to the zoning specification 106. The success response may be sent to the NNS 104.

With respect to the operation at locations 250 and 252, a map table may be updated after receiving an async notification from the NNS 104 for a created zone. For example, after receiving an async notification from the NNS 104, the zoning analysis module 102 may update the map table. Thereafter, the zoning analysis module 102 may respond back to the NNS 104 with a confirmation of a successful update of the map table.

At 254, the NNS 104 may forward a notification with respect to the zoning specification 106 to the host.

At 256, the communication implementation module 118 may receive another discovery command from the host. For example, the another discovery command may indicate "IP-B.y, Nqn.2014-08.org.nvmexpress.discovery, IP-D.y".

At 258, the communication implementation module 118 may forward, in response to the discovery command 120, a payload to the host. For example, the payload may indicate "IP-D.y→NQN.tgt1".

At 260, the communication implementation module 118 may receive, from the host, another NVMe connect command. For example, the another NVMe connect command may indicate "IP-B.y, NQN.tgt2, IP-D.y".

At 262, the communication implementation module 118 may establish, based on the further designation and an analysis of the another NVMe connect command, a connection between the another given NVMe subsystem (e.g., Sub-sys 2) of the NVMe storage domain and the another port (e.g., Port 2) of the host.

Figure 3:
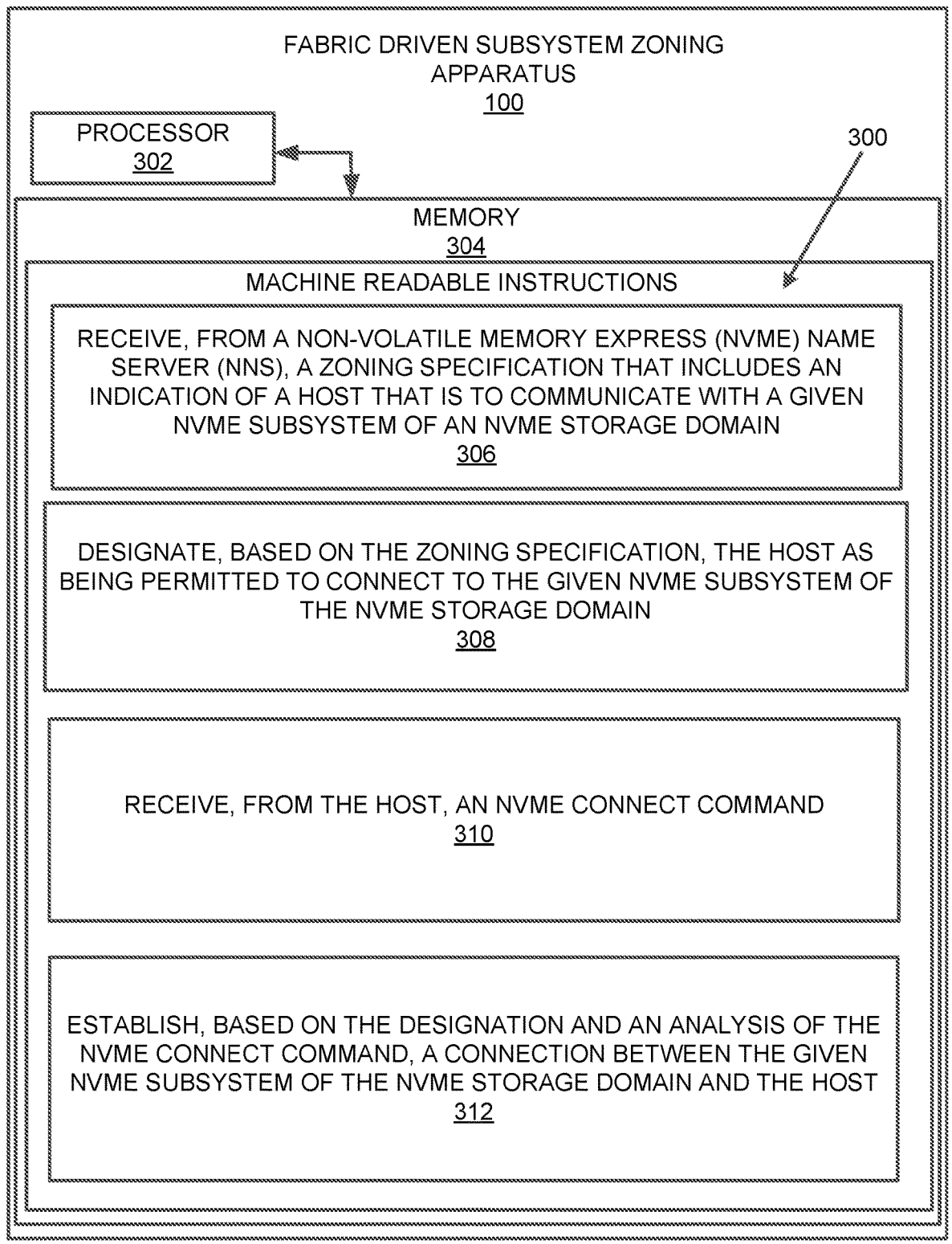
FIG. 3 illustrates an example block diagram for fabric driven NVMe subsystem zoning in accordance with an example of the present disclosure.
Figure 5:
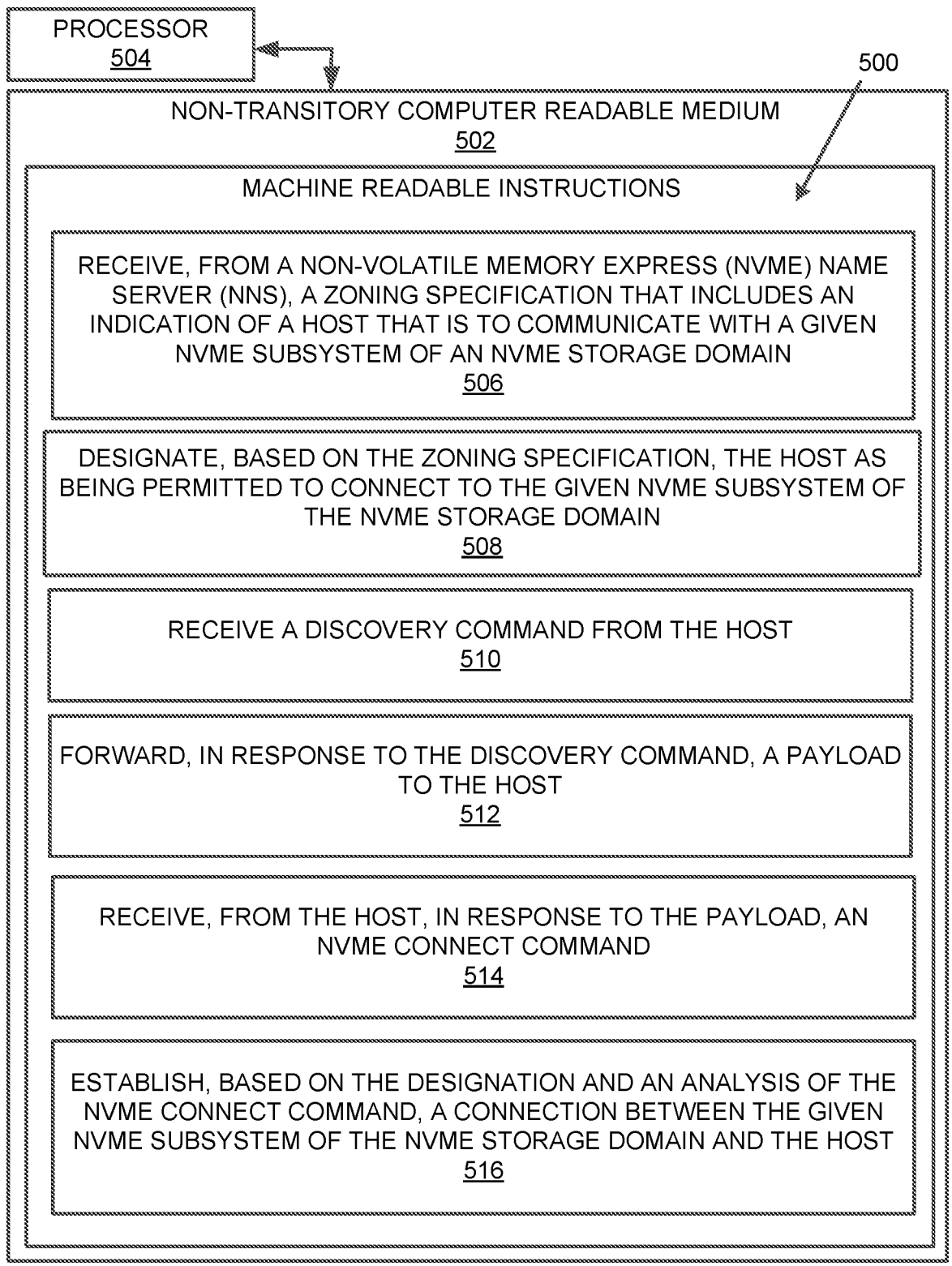
FIG. 5 illustrates a further example block diagram for fabric driven NVMe subsystem zoning in accordance with another example of the present disclosure.

FIGS. 3-5 respectively illustrate an example block diagram 300, a flowchart of an example method 400, and a further example block diagram 500 for fabric driven NVMe subsystem zoning, according to examples. The block diagram 300, the method 400, and the block diagram 500 may be implemented on the apparatus 100 described above with reference to FIG. 1 by way of example and not of limitation. The block diagram 300, the method 400, and the block diagram 500 may be practiced in other apparatus. In addition to showing the block diagram 300, FIG. 3 shows hardware of the apparatus 100 that may execute the instructions of the block diagram 300. The hardware may include a processor 302, and a memory 304 storing machine readable instructions that when executed by the processor cause the processor to perform the instructions of the block diagram 300. The memory 304 may represent a non-transitory computer readable medium. FIG. 4 may represent an example method for fabric driven NVMe subsystem zoning, and the steps of the method. FIG. 5 may represent a non-transitory computer readable medium 502 having stored thereon machine readable instructions to provide fabric driven NVMe subsystem zoning according to an example. The machine readable instructions, when executed, cause a processor 504 to perform the instructions of the block diagram 500 also shown in FIG. 5.

The processor 302 of FIG. 3 and/or the processor 504 of FIG. 5 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 502 of FIG. 5), such as hardware storage devices (e.g., RAM (random access memory), ROM (read only memory), EPROM (erasable, programmable ROM), EEPROM (electrically erasable, programmable ROM), hard drives, and flash memory). The memory 304 may include a RAM, where the machine readable instructions and data for a processor may reside during runtime.

Referring to FIGS. 1-3, and particularly to the block diagram 300 shown in FIG. 3, the memory 304 may include instructions 306 to receive, from an NNS 103, a zoning specification 105 that includes an indication of a host (of a plurality of hosts 108) that is to communicate with a given NVMe subsystem (of a plurality of NVMe subsystems 110) of an NVMe storage domain (of a plurality of NVMe storage domains 112).

The processor 302 may fetch, decode, and execute the instructions 308 to designate, based on the zoning specification 105, the host as being permitted to connect to the given NVMe subsystem of the NVMe storage domain.

The processor 302 may fetch, decode, and execute the instructions 310 to receive, from the host, an NVMe connect command 122.

The processor 302 may fetch, decode, and execute the instructions 312 to establish, based on the designation and an analysis of the NVMe connect command 122, a connection between the given NVMe subsystem of the NVMe storage domain and the host.

Referring to FIGS. 1-2G and 4, and particularly FIG. 4, for the method 400, at block 402, the method may include receiving, from an NNS 104, a zoning specification 106 that includes an indication of a host (of a plurality of hosts 108) that is to communicate with a given NVMe subsystem of an NVMe storage domain (of a plurality of NVMe storage domains 112) that includes a plurality of NVMe subsystems 110.

At block 404, the method may include designating, based on the zoning specification 106, the host as being permitted to connect to the given NVMe subsystem of the NVMe storage domain.

At block 406, the method may include receiving, from the host, an NVMe connect command 122.

At block 408, the method may include establishing, based on the designation and an analysis of the NVMe connect command 122, a connection between the given NVMe subsystem of the NVMe storage domain and the host.

Referring to FIGS. 1-2G and 5, and particularly FIG. 5, for the block diagram 500, the non-transitory computer readable medium 502 may include instructions 506 to receive, from an NNS 104, a zoning specification 106 that includes an indication of a host (of a plurality of hosts 108) that is to communicate with a given NVMe subsystem (of a plurality of NVMe subsystems 110) of an NVMe storage domain (of a plurality of NVMe storage domains 112).

The processor 504 may fetch, decode, and execute the instructions 508 to designate, based on the zoning specification 106, the host as being permitted to connect to the given NVMe subsystem of the NVMe storage domain.

The processor 504 may fetch, decode, and execute the instructions 510 to receive a discovery command 120 from the host.

The processor 504 may fetch, decode, and execute the instructions 512 to forward, in response to the discovery command 120, a payload to the host. The payload may mask NVMe subsystems of the NVMe storage domain that are different from the given NVMe subsystem of the NVMe storage domain. Further, the payload may include an IP address associated with an NQN for the given NVMe subsystem of the NVMe storage domain.

The processor 504 may fetch, decode, and execute the instructions 514 to receive, from the host, in response to the payload, an NVMe connect command 122.

The processor 504 may fetch, decode, and execute the instructions 516 to establish, based on the designation and an analysis of the NVMe connect command 122, a connection between the given NVMe subsystem of the NVMe storage domain and the host.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

The invention claimed is:

1. An apparatus in a non-volatile memory express (NVMe) storage domain, comprising:
   at least one processor; and
   a non-transitory computer readable medium storing machine readable instructions that when executed by the at least one processor cause the at least one processor to:
      receive, at the apparatus in the NVMe storage domain from an NVMe Name Server (NNS), a first zoning specification that includes an indication of a first port of a host that is to communicate with a first NVMe subsystem of the NVMe storage domain;
      designate, based on the first zoning specification, the host as being permitted to connect to the first NVMe subsystem of the NVMe storage domain;
      receive, at the apparatus from the host that is separate from the apparatus, a first NVMe connect command;
      establish, by the apparatus based on the designation and an analysis of the first NVMe connect command, a connection between the given first NVMe subsystem of the NVMe storage domain and the host;
      receive, at the apparatus from the NNS, a second zoning specification that includes an indication of a second port of the host that is to communicate with a second NVMe subsystem of the NVMe storage domain;
      further designate, based on the second zoning specification, the second port of the host as being permitted to connect to the second NVMe subsystem;
      receive, at the apparatus from the host, a second NVMe connect command; and
      establish, by the apparatus based on the further designation and an analysis of the second NVMe connect command, a connection between the second NVMe subsystem and the second port of the host.

2. The apparatus of claim 1, wherein the first zoning specification includes an indication of:
   an NVMe qualified name (NQN) for the host and an Internet Protocol (IP) address associated with the NQN for the host, and
   an NQN for the first NVMe subsystem of the NVMe storage domain and an IP address associated with the NQN for the first NVMe subsystem of the NVMe storage domain.

3. The apparatus of claim 1, wherein the first NVMe connect command includes an indication of:
   an Internet Protocol (IP) address associated with an NVMe qualified name (NQN) for the host, and
   an NQN for the first NVMe subsystem of the NVMe storage domain and an IP address associated with the NQN for the first NVMe subsystem of the NVMe storage domain.

4. The apparatus of claim 1, wherein the machine readable instructions to establish, based on the designation and the analysis of the first NVMe connect command, the connection between the first NVMe subsystem of the NVMe storage domain and the host comprise machine readable instructions to:
   determine whether the first NVMe connect command is from the host designated based on the first zoning specification;
   based on a determination that the first NVMe connect command is from the host, determine whether an Internet Protocol (IP) address of the first NVMe subsystem of the NVMe storage domain is associated with the host; and
   based on a determination that the IP address of the first NVMe subsystem of the NVMe storage domain is associated with the host, establish the connection between the first NVMe subsystem of the NVMe storage domain and the host.

5. A computer implemented method comprising:
   receiving, at a computer in a non-volatile memory express (NVMe) storage domain from an NVMe Name Server (NNS), a first zoning specification that includes an indication of a first port of a host that is to communicate with a first NVMe subsystem of the NVMe storage domain that includes a plurality of NVMe subsystems;
   designating, at the computer based on the first zoning specification, the host as being permitted to connect to the first NVMe subsystem of the NVMe storage domain;
   receiving, at the computer from the host that is separate from the computer, a first NVMe connect command;
   establishing, at the computer based on the designation and an analysis of the first NVMe connect command, a connection between the first NVMe subsystem of the NVMe storage domain and the host;
   receiving, at the computer from the NNS, a second zoning specification that includes an indication of a second port of the host that is to communicate with a second NVMe subsystem of the NVMe storage domain;

further designating, at the computer based on the second zoning specification, the second port of the host as being permitted to connect to the second NVMe subsystem;

receiving, at the computer from the host, a second NVMe connect command; and establishing, at the computer based on the further designation and an analysis of the second NVMe connect command, a connection between the second NVMe subsystem and the second port of the host.

6. The computer implemented method of claim 5, wherein the first zoning specification includes an indication of:

an NVMe qualified name (NQN) for the host and an Internet Protocol (IP) address associated with the NQN for the host, and an NQN for the first NVMe subsystem of the NVMe storage domain and an IP address associated with the NQN for the first NVMe subsystem of the NVMe storage domain, and wherein the first NVMe connect command includes an indication of:

the IP address associated with the NQN for the host, and the NQN for the first NVMe subsystem of the NVMe storage domain and the IP address associated with the NQN for the first NVMe subsystem of the NVMe storage domain.

7. A non-transitory computer readable medium comprising machine readable instructions that when executed, cause a computer in a non-volatile NVMe storage domain to:

receive, at the computer in the NVMe storage domain from an NVMe Name Server (NNS), a first zoning specification that includes an indication of a first port of a host that is to communicate with a first NVMe subsystem of the NVMe storage domain;

designate, at the computer based on the first zoning specification, the host as being permitted to connect to the first NVMe subsystem of the NVMe storage domain;

receive, at the computer from the host that is separate from the computer, a first NVMe connect command;

establish, at the computer based on the designation and an analysis of the first NVMe connect command, a connection between the first NVMe subsystem of the NVMe storage domain and the host;

receive, at the computer from the NNS, a second zoning specification that includes an indication of a second port of the host that is to communicate with a second NVMe subsystem of the NVMe storage domain;

further designate, at the computer based on the second zoning specification, the second port of the host as being permitted to connect to the second NVMe subsystem;

receive, at the computer from the host, a second NVMe connect command; and establish, at the computer based on the further designation and an analysis of the second NVMe connect command, a connection between the second NVMe subsystem and the second port of the host.

8. The non-transitory computer readable medium of claim 7, wherein the machine readable instructions include instructions executable to:

receive, at the computer prior to receiving the first NVMe connect command, a discovery command from the host;

forward, from the computer in response to the discovery command, a payload to the host, the payload masking NVMe subsystems of the NVMe storage domain that are different from the first NVMe subsystem of the NVMe storage domain.

9. The apparatus of claim 1, wherein the machine readable instructions are to cause the at least one processor to:

receive, prior to receiving the first NVMe connect command, a discovery command from the host; and forward, in response to the discovery command, a payload to the host, the payload masking NVMe subsystems of the NVMe storage domain that are different from the first NVMe subsystem of the NVMe storage domain.

10. The apparatus of claim 9, wherein the payload masks the NVMe subsystems different from the first NVMe subsystem by excluding, from the payload, NVMe qualified names (NQNs) of the NVMe subsystems that are different from the first NVMe subsystem.

11. The apparatus of claim 9, wherein the machine readable instructions are to cause the at least one processor to:

perform the masking in response to the first zoning specification.

12. The apparatus of claim 11, wherein the machine readable instructions are to cause the at least one processor to:

update a masking table based on the first zoning specification, wherein the masking is based on the updated masking table.

13. The computer implemented method of claim 5, comprising:

receiving, at the computer prior to receiving the first NVMe connect command, a discovery command from the host; and forwarding, by the computer in response to the discovery command, a payload to the host, the payload masking NVMe subsystems of the NVMe storage domain that are different from the first NVMe subsystem of the NVMe storage domain.

14. The computer implemented method of claim 13, wherein the payload masks the NVMe subsystems different from the first NVMe subsystem by excluding, from the payload, NVMe qualified names (NQNs) of the NVMe subsystems that are different from the first NVMe subsystem.

15. The computer implemented method of claim 13, comprising:

performing, by the computer, the masking in response to the first zoning specification.

16. The computer implemented method of claim 15, comprising:

updating, by the computer, a masking table based on the first zoning specification, wherein the masking is based on the updated masking table.

17. The non-transitory computer readable medium of claim 8, wherein the payload masks the NVMe subsystems different from the first NVMe subsystem by excluding, from the payload, NVMe qualified names (NQNs) of the NVMe subsystems that are different from the first NVMe subsystem.

18. The non-transitory computer readable medium of claim 17, wherein the machine readable instructions include instructions executable to:

perform, at the computer, the masking in response to the first zoning specification.

19. The non-transitory computer readable medium of claim 18, wherein the machine readable instructions include instructions executable to:

update, at the computer, a masking table based on the first zoning specification, wherein the masking is based on the updated masking table.

\* \* \* \* \*